US009465491B2

(12) United States Patent
Shaikh et al.

(10) Patent No.: US 9,465,491 B2
(45) Date of Patent: Oct. 11, 2016

(54) METHOD FOR FORMING A CAPACITIVE TOUCH SENSOR FOR IDENTIFYING A FINGERPRINT (71) Applicants: Jalil Shaikh, Fremont, CA (US); Esat Yilmaz, Santa Cruz, CA (US)

(72) Inventors: Jalil Shaikh, Fremont, CA (US); Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/057,107

(22) Filed: Oct. 18, 2013

(65) Prior Publication Data
US 2014/0047706 A1 Feb. 20, 2014

Related U.S. Application Data (63) Continuation of application No. 12/938,050, filed on Nov. 2, 2010, now Pat. No. 8,564,314.

(51) Int. Cl.
G06K 9/00 (2006.01)
G06F 3/044 (2006.01)

(52) U.S. Cl.
CPC ............ *G06F 3/044* (2013.01); *G06K 9/0002* (2013.01); *Y10T 29/49105* (2015.01); *Y10T 29/49124* (2015.01)

(58) Field of Classification Search
CPC ................ G06F 3/044; G06F 3/0412; G06F 2203/04103; H03K 2017/9613
USPC .......... 29/592.1, 25.35–25.42; 324/686–687, 324/658; 382/124–126
See application file for complete search history.

(56) References Cited

U.S. PATENT DOCUMENTS 5,325,442 A * 6/1994 Knapp ................... G01B 7/004
361/278

5,828,773 A * 10/1998 Setlak .................. G06K 9/0002
382/126
5,862,248 A * 1/1999 Salatino et al. .............. 382/124
5,869,791 A 2/1999 Young
6,114,862 A * 9/2000 Tartagni ............... G06K 9/0002
324/661
6,462,563 B1 10/2002 Kawahara et al.
7,030,860 B1 * 4/2006 Hsu ......................... G06F 3/044
178/18.06

(Continued)

FOREIGN PATENT DOCUMENTS

CN 1161737 C 8/2004
CN 101515322 A 8/2009

(Continued)

OTHER PUBLICATIONS

U.S. Appl. No. 61/454,936, filed Mar. 21, 2011, Myers.

(Continued)

*Primary Examiner* — Minh Trinh
(74) *Attorney, Agent, or Firm* — Baker Botts L.L.P.

(57) ABSTRACT

A method of forming a capacitive sensor includes forming a capacitive touch position sensor including a first plurality electrodes sense electrodes and drive electrodes in a touch sensing area of a capacitive sensor. The first plurality of sense electrodes and drive electrodes are configured to enable detection of the presence and position of a touch in the touch sensing area. The method also includes forming a capacitive finger print sensor including a second plurality of sense electrodes and drive in a fingerprint sensing area of the capacitive sensor. The second plurality of sense electrodes and drive are configured to enable identification of the fingerprint of a finger placed in the fingerprint sensing area.

18 Claims, 8 Drawing Sheets (56) References Cited

U.S. PATENT DOCUMENTS

| | | | |
|---|---|---|---|
| 7,663,607 | B2 | 2/2010 | Hotelling |
| 7,671,847 | B2 | 3/2010 | Weng |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,102,286 | B2 | 1/2012 | Philipp |
| 8,179,381 | B2 | 5/2012 | Frey |
| 8,564,314 | B2 * | 10/2013 | Shaikh et al. ............. 324/686 |
| 2002/0196036 | A1 | 12/2002 | Toyoshima et al. |
| 2005/0077911 | A1 | 4/2005 | Miyasaka |
| 2008/0142352 | A1 * | 6/2008 | Wright ..................... 200/600 |
| 2008/0205714 | A1 * | 8/2008 | Benkley et al. .......... 382/126 |
| 2008/0238878 | A1 | 10/2008 | Wang |
| 2008/0278178 | A1 * | 11/2008 | Philipp ..................... 324/662 |
| 2009/0315854 | A1 | 12/2009 | Matsuo |
| 2010/0098303 | A1 * | 4/2010 | Chen ................ G06K 9/0002 382/124 |
| 2011/0095997 | A1 | 4/2011 | Philipp |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076485 | A1 * | 3/2013 | Mullins ............... G06F 21/32 340/5.83 |
| 2013/0076612 | A1 | 3/2013 | Myers |
| 2014/0047706 | A1 * | 2/2014 | Shaikh et al. .............. 29/622 |

FOREIGN PATENT DOCUMENTS

| | | |
|---|---|---|
| CN | 101727571 A | 6/2010 |
| EP | 2 178 026 A1 | 4/2010 |
| TW | 200625197 | 7/2006 |
| TW | M368848 U1 | 11/2009 |
| TW | M378432 U1 | 4/2010 |
| TW | 2010555 A | 5/2010 |
| WO | WO 2012/129247 | 9/2012 |

OTHER PUBLICATIONS

U.S. Appl. No. 61/454,950, filed Mar. 21, 2011, Lynch.
Cambrios Technologies Corporation Awarded Department of Defence Contract for Flexible Solar Cells, Sunnyvale, CA, Apr. 12, 2010, Cambrios Technologies Corp., Printed from website: http://www.cambrios.com/200/DOD_Release.htm on Apr. 20, 2010.
Core Applications & Technologies, Printing of Antennas and Flexible Circuits, Conductive InkJet Technology Ltd. (2009).
U.S. Appl. No. 61/454,894, filed Mar. 21, 2011, Rothkopf.
Horteis et al., "Fine Line Printed and Plated Contacts on High Ohmic Emitters Enabling 20% Cell Efficiency," Fraunhofer Institute for Solar Energy Systems, IEEE (2009).
Latest News, Conductive InkJet Technology, Printed from Website: http://www.conductiveinkjet.com/about-us/latest-news/2009.aspx on Apr. 20, 2010.
News, New Silver Conductive Inks Target High-Growth Touch Screen and OLED Markets, DuPont Microcircuit Materials Expands Innovative Offerings for Printed Electronics, Research Triangle Park, N.C., Apr. 13, 2010, Printed from website: http://www2dupont.com/MCM/en_US/news_events/article20100413.html on Apr. 20, 2010.
Office Action of the Intellectual Property Office, Taiwanese Office Action regarding Patent Application No. 100138521 issued Jul. 15, 2015 (English translation attached), Jul. 15, 2015.
First Office Action Issued by State Intellectual Property Office for Application No. 201110346025.3; ref. 2015082604993300 and Translation (CN11383/100005), Aug. 31, 2015.
Second Office Action Issued by State Intellectual Property Office for Application No. 201110346025.3; Office Action and Translation dated Apr. 1, 2016 and reported to Baker Botts L.L.P. on May 10, 2016.

* cited by examiner

METHOD FOR FORMING A CAPACITIVE TOUCH SENSOR FOR IDENTIFYING A FINGERPRINT

RELATED APPLICATION

This continuation application claims the benefit under 35 U.S.C. §120 of the priority of U.S. patent application Ser. No. 12/938,050, filed Nov. 2, 2010, entitled "A Capacitive Touch Sensor for identifying a Fingerprint"

BACKGROUND

A touch position sensor can detect the presence and location of a touch by a finger or by another object, such as a stylus. A touch position sensor, for example, can detect the presence and location of a touch within an area of an external interface of the touch position sensor. In a touch sensitive display application, the touch position sensor enables direct interaction with what is displayed on the screen, rather than indirectly with a mouse or touchpad.

Touch position sensors can be attached to or provided as part of devices with a display, such as computers, personal digital assistants, satellite navigation devices, mobile telephones, portable media players, portable game consoles, public information kiosks and point of sale systems. Touch position sensors have also been used as control panels on appliances.

There are a number of different types of touch position sensors, such as resistive touch screens, surface acoustic wave touch screens, capacitive touch screens, etc. A capacitive touch screen, for example, may include an insulator coated with a transparent conductor in a particular pattern. When a finger or other object touches the surface of the screen, there is a change in capacitance. This change in capacitance may be sent to a controller for processing to determine the position of the touch.

There also are a number of different types of fingerprint sensors. Examples include optical fingerprint sensors, thermal fingerprint sensors and capacitive fingerprint sensors.

SUMMARY

Disclosed examples of capacitive sensors may determine presence and location of a touch and may determine a fingerprint pattern.

BRIEF DESCRIPTION OF THE FIGURES

The figures depict one or more implementations in accordance with the present teachings by way of example, not by way of limitation. In the figures, like reference numerals refer to the same or similar elements.

DETAILED DESCRIPTION

In the following detailed description, numerous specific details are set forth by way of examples in order to explain the relevant teachings. In order to avoid unnecessarily obscuring aspects of the present teachings, those methods, procedures, components and/or circuitry that are well-known to one of ordinary skill in the art have been described at a relatively high level.

Reference now is made in detail to the examples illustrated in the accompanying figures and discussed below.

Figure 1:
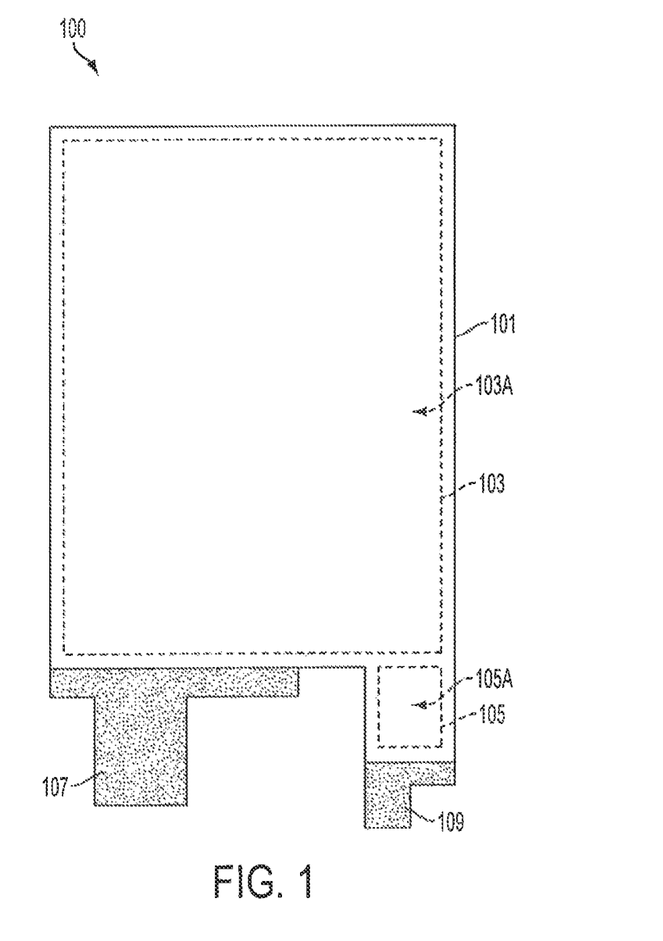
FIG. 1 illustrates schematically a first exemplary capacitive sensing panel that includes a touch position sensor and a fingerprint sensor.

FIG. 1 illustrates a capacitive sensor 100 having a substrate 101. The capacitive sensor 100 includes a capacitive touch position sensor 103 with a touch sensing area 103A and a capacitive fingerprint sensor 105 with a fingerprint sensing area 105A.

The touch position sensor 103 may be configured to detect the presence and location of a touch by a finger, stylus or the like. The fingerprint sensor 105 may be configured to determine the pattern of a fingerprint, which may be compared to one or more stored fingerprint patterns to determine if there is a match between determined and stored fingerprint patterns. Stored fingerprint patterns may include one or more fingerprint patterns of one or more specific users, for example, to identify the user. Stored fingerprint patterns may include general patterns for specific fingers of a hand, including an index finger, a middle finger, a ring finger, a little finger and a thumb, for distinguishing between different fingers.

Light may be transmitted through the touch position sensor 103 so that light emitted from a light source underlying the touch position sensor 103, such as a backlight or a display, is visible to a user of the touch position sensor 103. The fingerprint sensor 105, on the other hand, is outside touch sensing area 103A and as such may or may not transmit light.

Exemplary displays for use with capacitive sensor 100 include, without limitation, liquid crystal displays, electronic ink displays, organic light-emitting diode displays, plasma displays and cathode ray tube displays.

In the example of FIG. 1, the touch position sensor 103 and the fingerprint sensor 105 are connected to separate printed circuits 107 and 109, respectively. The printed circuits 107 and 109 may be flexible printed circuits (FPCs). The FPCs may provide connections of the electrodes of the two sensors 103 and 105 to two control units. In other examples, both the touch position sensor 103 and the fingerprint sensor 105 may be connected to a common FPC with a single connector for connection to a control unit.

The touch position sensor 103 and the fingerprint sensor 105 may each independently be selected from any suitable capacitive sensor, including mutual-capacitance and self-capacitance sensors. Self-capacitance sensors include individual electrodes. Mutual capacitance type sensors as discussed in most of the examples below, have drive electrodes and sense electrodes. Electrodes of the two capacitive sensors may be formed on at least one substrate that is common to both of the sensors, such as the substrate 101 in the example of FIG. 1.

Figure 2A:
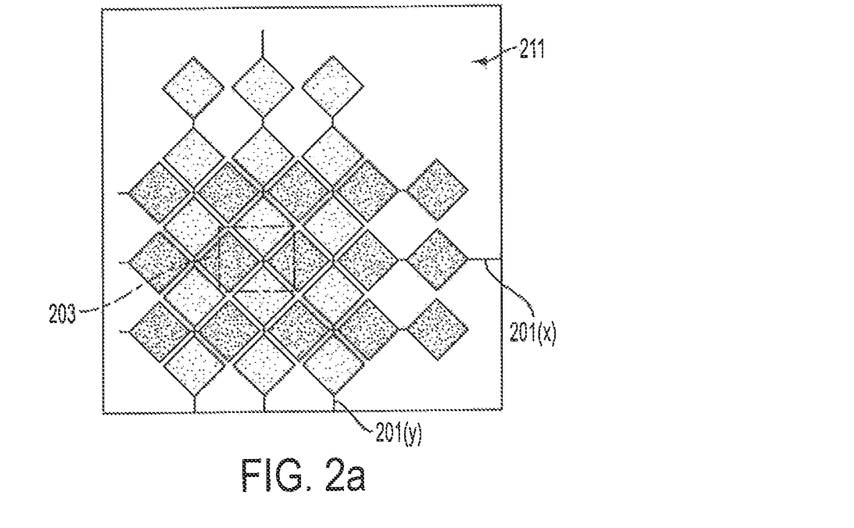
FIG. 2a illustrates schematically a plan view of a portion of an exemplary capacitive sensing panel.
Figure 2B:
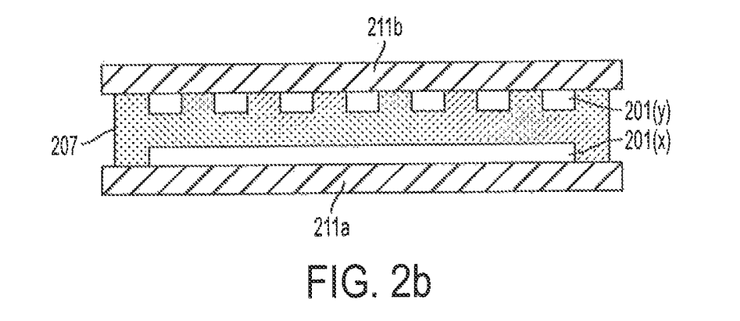
FIG. 2b illustrates schematically a cross section of the relevant layers of an arrangement of drive and sense electrodes of an exemplary capacitive sensing panel using two substrates.
Figure 2C:
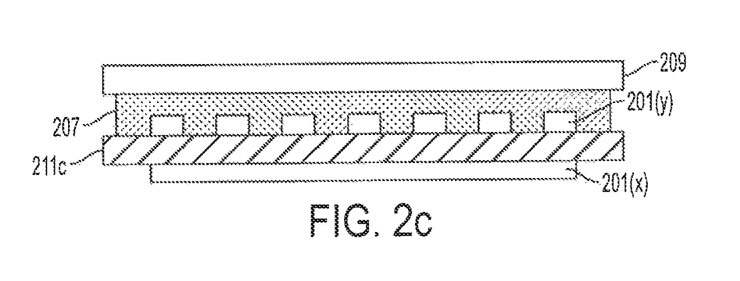
FIG. 2c illustrates schematically a cross section of the relevant layers of another arrangement of drive and sense electrodes of an exemplary capacitive sensing panel using one substrate.

Each of FIGS. 2a to 2c shows an arrangement of drive electrodes 201(*x*) and sense electrodes 201(*y*) of a capacitive sensor, for example, for any of the sensors 103 and 105 of FIG. 1.

With reference to FIG. 2a, the drive electrodes 201(*x*) and the sense electrodes 201(*y*) of a capacitive sensor may be arranged in electrical isolation from each other on the same surface of substrate 211. It will be appreciated that the sense and drive electrodes may have any shape and arrangement. For example, drive electrodes 201(*x*) may surround sense electrodes 201(*y*). Capacitive sensing channels 203 are formed in the sensing area at the regions where edges of the drive electrodes 201(*x*) and sense electrodes 201(*y*) are adjacent.

In other examples, the drive electrodes 201(*x*) and the sense electrodes 201(*y*) of a capacitive sensor may be arranged on opposite surfaces of an insulating substrate so that the substrate provides the electrical isolation of the drive and sense electrodes from each other. An example of such a capacitive sensing panel structure with one substrate will be discussed in detail with regard to FIG. 2c. In another example, the drive electrodes 201(*x*) and sense electrodes 201(*y*) may be formed on different substrates with an insulator provided between the drive and sense electrodes. An example of such a capacitive sensing panel structure with two substrates will be discussed in detail with respect to FIG. 2b.

Referring first to FIG. 2b showing the relevant layers of a capacitive sensing panel structure, the drive electrodes 201(*x*) may be provided on a first substrate 211a, and the sense electrodes 201(*y*) may be provided on a second substrate 211b. The drive electrodes 201(*x*) and the sense electrodes 201(*y*) are spaced apart by a layer of non-conducting material 207, for example, an optically clear adhesive. Capacitive sensing channels are formed at the capacitive coupling nodes, which exist in the localized regions surrounding where the drive and sense electrodes 201(*x*) and 201(*y*) cross over each other and are separated by the non-conducting material 207. A node sensing area encompasses each or substantially each intersection formed by a crossover of a drive electrode and a sense electrode. Although not shown in this example, some implementations may include a transparent cover sheet. The transparent cover sheet may be attached to and spaced apart from other elements of the sensing panel by a suitable material, such as an optically clear adhesive.

In another arrangement illustrated in FIG. 2c showing the relevant layers of a capacitive sensing panel structure, the sense electrodes 201(*y*) and the drive electrodes 201(*x*) are formed on opposing surfaces of the same substrate 211c. The substrate 211c may be formed of an insulating material. Capacitive sensing channels are formed at the capacitive coupling nodes which exist in the localized regions surrounding where the drive and sense electrodes 201(*x*) and 201(*y*) cross over each other and are separated by the insulating substrate 211c. A transparent cover sheet 209 may be spaced apart from the sense electrodes 201)*y*). A suitable material, such as an optically clear adhesive layer 207, provides the spacing between and bonds the transparent cover sheet 209 to the electrodes 201(*y*) and the substrate 211c.

Each of the various substrates and/or the cover sheet may be formed from a transparent non-conductive material, such as glass or a plastic. Plastic substrates and cover sheets may be suitable where flexibility of the capacitive sensing panel may be required. Examples of suitable plastic substrate materials include, but are not limited to, polyethylene terephthalate (PET), polyethylene naphthalate (PEN) and polycarbonate (PC). Examples of suitable plastic materials for the transparent cover sheet 209 include, but are not limited to, polycarbonate and poly(methyl methacrylate) (PMMA).

FIGS. 2b and 2c represent two different examples of structures that may form the drive and sense electrodes for a mutual capacitance type touch sensing panel. Other structures also may be used. In the examples of FIGS. 2b and 2c, the drive and sense electrodes 201(*x*), 201(*y*) may form a pattern in the touch sensing area similar to that shown in FIG. 2a. Several other electrode patterns that may use structures like either of those shown in FIGS. 2b and 2c are discussed with regard to later examples.

Referring again to FIG. 1, the capacitive fingerprint sensor 105 may be implemented as a smaller scale version of the capacitive touch position sensor 103. In the fingerprint sensor 105, individual ridges of a fingerprint are detected at channels of the detector. In contrast, the touch position sensor 103 may be configured to detect the position of a finger or stylus. The fingerprint sensor may be formed using methods and materials that are similar to methods and materials used to form the touch position sensor 103, except on a smaller scale and to provide a higher electrode density. The electrodes of both the capacitive touch position sensor 103 and the capacitive fingerprint sensor 105 may be formed on one or more common substrates, for example, using any of the substrate and electrode arrangements shown in FIGS. 2a to 2c. As discussed later, some or all of the processing steps for forming the electrodes of the sensors 103, 105 may be the same.

Figure 3:
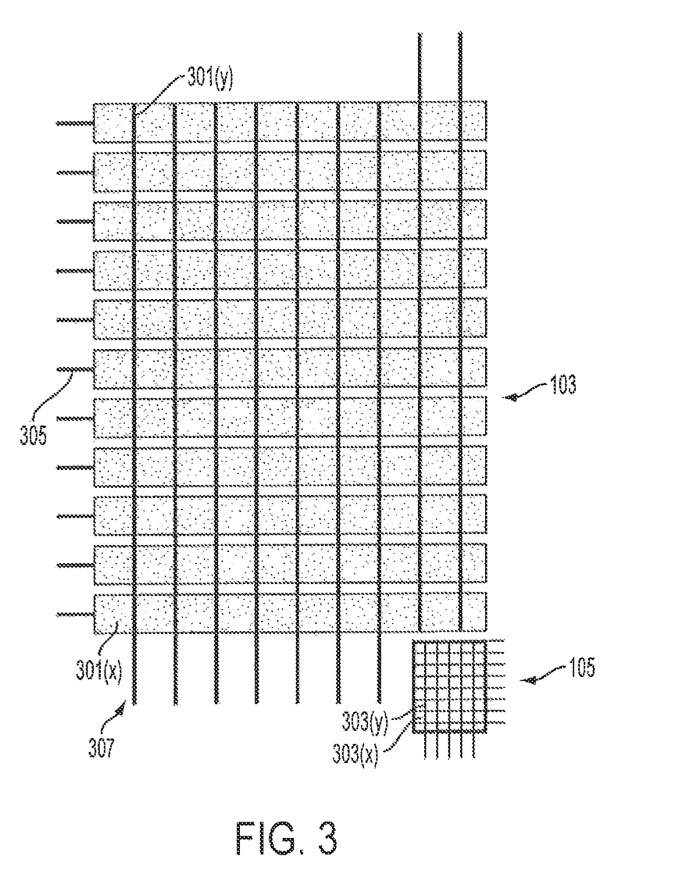
FIG. 3 illustrates schematically the drive and sense electrodes, which may be used in a capacitive sensing panel like the panel of FIG. 1.

FIG. 3 illustrates another exemplary electrode arrangement for the capacitive sensor 100 of FIG. 1, in this case, including electrodes of both the touch position sensor 103 and the fingerprint sensor 105. In the example of FIG. 3, the touch position sensor 103 includes drive electrodes 301(*x*) and sense electrodes 301(*y*) formed on different surfaces of one or more substrates common to the two sensors, for example, in a manner similar to that illustrated in either of FIGS. 2b and 2c. The fingerprint sensor 105 includes drive electrodes 303(*x*) and sense electrodes 303(*y*) formed on different surfaces of the one or more common substrates. Drive electrode connecting lines 305 are shown leading out from the drive electrodes 301(*x*) for connection to a FPC such as 107 in FIG. 1. Sense electrode connecting lines 307 are provided to connect sense electrodes 301(*y*) to the FPC. The patterns of the connecting lines are shown by way of an example only. Electrodes 303(*x*) and 303(*y*) of the fingerprint sensor 105 may be connected by connecting lines on a FPC similar to FPC 109 in FIG. 1.

The width of the drive and sense electrodes may depend on the touch-sensitive application in which the touch position sensor 103 is to be used. The drive and/or sense electrodes of the mutual capacitance touch position sensor 103 may be up to about 20 mm wide. In an example using a transparent conductive material such as ITO, sense electrodes may be greater than about 0.2 mm wide and drive electrodes may be greater than about 3 mm wide. In an example using fine metal lines, each line may be greater than about 1 µm, but electrode widths may still be in the range of about 3 mm or larger. Similar dimensions may apply to electrodes of a self-capacitance touch position sensor.

The drive and sense electrodes $301(x)$ and $301(y)$ of the touch position sensor 103 may each be formed from a conductive material. Suitable transparent materials include transparent inorganic and organic conductive materials, such as ITO (indium tin oxide), ATO (antimony tin oxide), tin oxide, PEDOT or other conductive polymers, and carbon nanofube or metal nanowire impregnated materials.

If a transparent conductive material, such as ITO, is used to form the drive electrodes $301(x)$, then each electrode may be formed from solid blocks of the transparent conductive material. For the drive electrodes $301(x)$, the space between adjacent electrodes may be made as narrow as possible, for example, to enhance shielding of the sense electrodes $301(y)$ against noise arising from the underlying display. With reference to FIG. 1, at least 90% of the sensing area 103A may be covered by transparent conductive material of the drive electrodes, and the gap between adjacent drive electrodes $301(x)$ may be no more than 300 microns. In such an example, substantially the whole of the area of each intersection may be shielded by the solid drive electrode blocks.

In other examples, one or both of the drive and sense electrodes $301(x)$ and $301(y)$ of the touch position sensor 103 may be formed from a mesh or other pattern of fine lines of an opaque conductive material that is sized and patterned to allow transmission of light through the mesh electrodes. Suitable opaque conductor materials include copper, silver, gold, aluminum, tin and other metals suitable for use in conductive wiring. The fine lines may be from about 1 micron wide up to about 20 microns wide. Each electrode may include a mesh or other pattern of fine lines formed of the appropriate electrode width. Narrower lines may reduce visibility to the naked eye. The fine conductive lines of the electrodes of an electrode layer may be formed such that up to about 10% of the touch sensing area 103a is covered by an electrode material. Widths and spacings to provide coverage in the exemplary range allow for good transparency of the sensing panel. Configuring the line pattern to reduce the coverage percentage toward the lower end of the range, for example, around 3% or lower, increases transparency and reduces perceptible darkening or other loss of display quality.

As with the electrodes of the touch position sensor 103, the drive electrodes $303(x)$ and sense electrodes $303(y)$ of the fingerprint sensor 105 of FIG. 3 may be formed on different surfaces. The fingerprint drive electrodes $303(x)$ may be formed on the same substrate surface as the drive electrodes $301(x)$ of the touch position sensor 103, and the fingerprint sense electrodes $303(y)$ may be formed on the same substrate surface as the sense electrodes $301(y)$ of the touch position sensor 103.

In this example, the fingerprint drive and sense electrodes $303(x)$ and $303(y)$ may be formed from fine lines of a conductive material, which may be an opaque conductive material such as a metal. However, a conductive transparent material may be used to form the fingerprint drive and sense electrodes $303(x)$ and $303(y)$, as described above relative to the electrodes of the touch position sensor 103. In some examples, the electrode lines may be from about 1 micron wide up to about 20 microns wide, and spacing between electrode lines may be up to about 200 microns. The fine lines of the fingerprint drive and sense electrodes $303(x)$ and $303(y)$ may be formed in the same way as lines of the drive and sense electrodes $301(x)$ and $301(y)$ of the touch position sensor 103. In contrast to electrodes of the touch position sensor 103, the width and spacing of each electrode of the fingerprint sensor 105 may be suitable to allow detection of a fingerprint pattern. It will be appreciated that accuracy of fingerprint determination and matching will increase with the number of channels in the fingerprint sensing area 105A. The number of channels in the fingerprint sensing area 105A may depend at least in part on the width and spacing of the fingerprint drive and sense electrodes $303(x)$ and $303(y)$.

Electrodes of the touch position sensor 103 and the fingerprint sensor 105 may be formed on the same substrate surface(s), as described above. Furthermore, drive and sense electrodes of the touch position sensor 103 and the fingerprint sensor 105, respectively, may be formed from the same material and/or in the same processing step. For example, the drive electrodes $301(x)$, $303(x)$ may be formed by a mesh or other pattern of fine lines of an opaque conductive material, such as a metal. In such an example, the drive electrodes $301(x)$, $303(x)$ may be formed by a pattern of fine lines of opaque conductive material. Since the electrodes of the touch position sensor 103 and the fingerprint sensor 105 are on the same surface or surfaces of the substrate, electrodes of the touch position sensor 103 and the fingerprint sensor 105 may be formed via similar processing steps.

The connecting lines 305 and/or 307 of the touch position sensor 103 may be formed in the same processing step and/or from similar material as connecting lines for the fingerprint sensor 105. The material and/or processing steps used to form the connecting lines of one of the sensors 103 and 105 may also be used to form electrodes of the other of the sensors 103 and 105.

In the example of FIG. 3, both the touch position sensor and the fingerprint sensor are mutual capacitance sensors in which drive and sense electrodes are formed on different surfaces of the substrate or substrates shared by the two sensors. However, the touch position sensor 103 and the fingerprint sensor 105 may each be any suitable form of a capacitance sensor, and the two sensors may be of the same or different types. Examples of types of sensors usable as either one or both of the touch position sensor and the fingerprint sensor include:
  self capacitance sensors in which electrodes are formed on one surface only;
  mutual capacitance sensors in which drive and sense electrodes are formed on the same surface;
  mutual capacitance sensors in which drive and sense electrodes are formed on different surfaces of different substrates; and
  mutual capacitance sensors in which drive and sense electrodes are formed on opposite surfaces of the same substrate.

In the case where electrodes of the touch position sensor 103 and/or the fingerprint sensor 105 are formed on more than one surface, then similar material and/or similar processing steps may be used in forming touch position sensor and fingerprint sensor electrodes on one or both surfaces.

Figure 4:
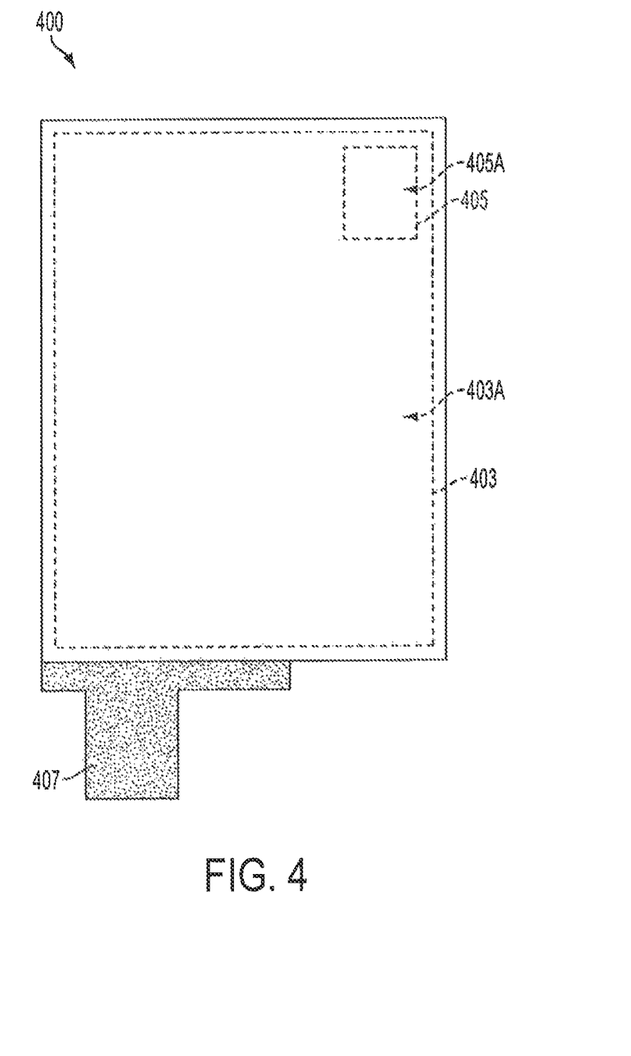
FIG. 4 illustrates schematically another exemplary capacitive sensing panel.

FIG. 4 illustrates another exemplary capacitive sensor 400 that includes a touch position sensor 403 having a touch sensing area 403A and a fingerprint sensor 405 having a fingerprint sensing area 405A. In this example, the fingerprint sensor 405 is within the perimeter of the touch sensing area 403A. Also, the fingerprint sensor 405 and the touch position sensor 403 may be connected to a common FPC 407. In other examples, the sensors 403 and 405 may be connected to separate FPCs. Elements in FIG. 4 are similar to those in FIG. 3, however, the touch sensing area 403A now encompasses the fingerprint sensor 405 together with fingerprint sensing area 405A.

Figure 5:
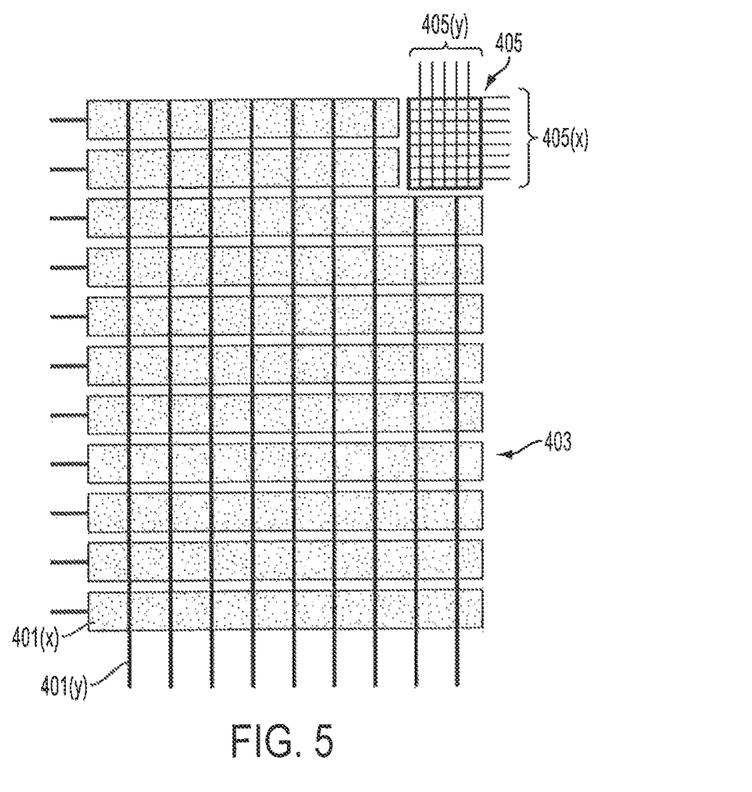
FIG. 5 illustrates schematically an arrangement of drive and sense electrodes of the capacitive sensing panel example of FIG. 4.

FIG. 5 shows an exemplary electrode arrangement for the capacitive sensor 400 of FIG. 4. The touch position sensor includes drive electrodes 401(*x*) and sense electrodes 401(*y*), and the fingerprint sensor includes drive electrodes 405(*x*) and sense electrodes 405(*y*). The electrodes of both sensors may be formed on different surfaces of the one or more common substrates. The electrodes of the touch position sensor 403 and the fingerprint sensor 405 may each be formed with appropriate dimensions using materials and processes similar to those described above with reference to FIGS. 1-3. As the fingerprint sensor 405 is in the touch sensing area 403A, the fingerprint sensor 405 may be formed so as to meet the minimum optical requirements of the touch position sensor 403, such as light transmissivity.

In use, data may be unlocked and/or an application may be launched following determination of a fingerprint using fingerprint sensor 405, after which fingerprint sensing may not be required for a period of time. When not required for fingerprint sensing, the fingerprint sensor 405 may be used for touch sensing, in combination with the touch position sensor 403. Accordingly, the fingerprint sensor 405 may be switchable between a fingerprint sensing mode and a touch sensing mode. Each of the channels of the fingerprint sensing area 405A may be used along with the channels outside the fingerprint sensing area 405A in order that the whole of the touch sensing area 403A is touch sensitive.

The density of channels in the fingerprint sensing area 405A may be higher than the density of channels required for most touch sensing applications, such as sensing the presence and location of a finger or a stylus. For example, if the fingerprint sensing area 405A contains n fingerprint sensor channels for use in a fingerprint sensing mode then the signals from these channels may be combined in order to provide m channels in touch sensing mode in which 1≤m<n. This allows sensing of the presence and location of a touch in the fingerprint sensing area 405A without requiring processing of signals received from all of the channels in the fingerprint sensing area 405A.

Figure 6:
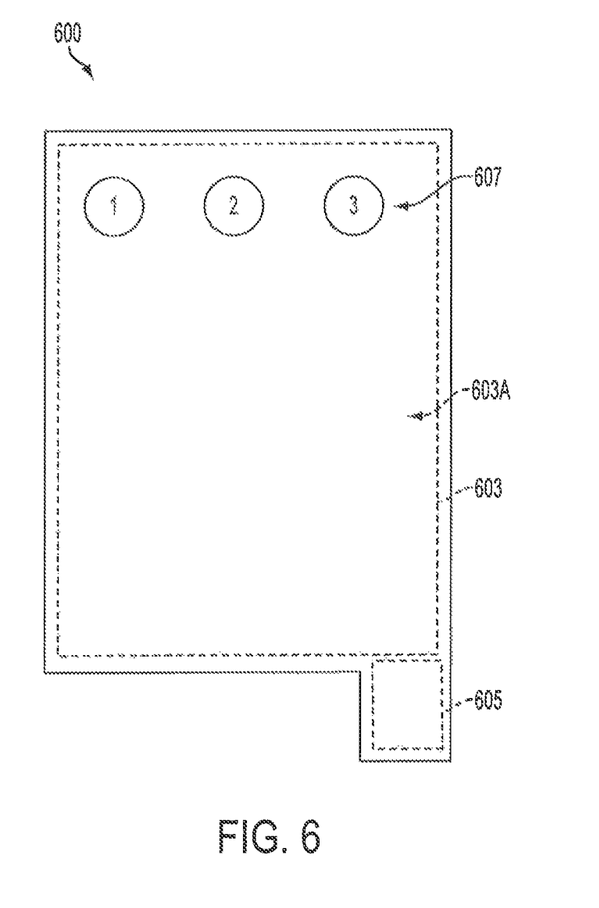
FIG. 6 illustrates schematically a further exemplary capacitive sensing panel.

FIG. 6 illustrates an exemplary capacitive sensor 600 including a touch position sensor 603 having a touch sensing area 603A and a fingerprint sensor 605. In some examples, a fingerprint of an individual may be recognized. In other examples, multiple fingerprints from an individual may be recognized. The different fingerprints may be those of a specific user, or the sensor may use fingerprint patterns to distinguish between different fingers of a hand not specific to a particular user.

A display underlying the capacitive sensor 600 and arranged for viewing through touch sensing area 603A may launch a specific application, presented to a user as icons 607, and/or provide access to specific data which may be unlocked upon detection of a specific fingerprint by the fingerprint sensor 605. For example, determination of a touch by an index finger fingerprint pattern may launch application (1), determination of a touch by a middle finger fingerprint pattern may launch a second application (2), and determination of a touch by a ring finger fingerprint pattern may launch a third application (3). In other examples, one or more fingerprint sensors analogous to sensor 405 in the example of FIG. 4 may be within the touch sensing area 603A and aligned with one or more icons 607.

Figure 7:
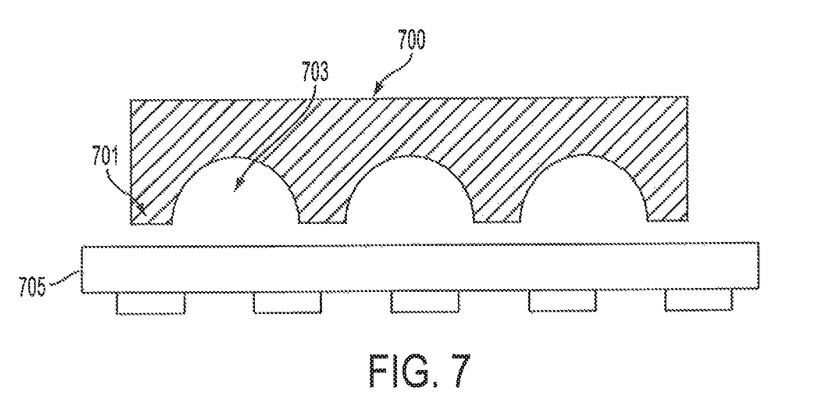
FIG. 7 is a cross sectional view showing portions of an exemplary capacitive fingerprint sensor and a finger.

FIG. 7 depicts a portion of an exemplary capacitive fingerprint sensor 705 and a portion of a finger 700 in cross section, to show the fingerprint as the finger 700 comes into contact with the fingerprint sensor 705 and the fingerprint sensor 705 operates to sense aspects of the fingerprint. The fingerprint of a finger 700 includes ridges 701 separated by gaps 703. The ridges 701 are arranged in patterns, such as whorls, arches and loops. When a finger 700 approaches and comes in contact with the fingerprint sensor 705, ridges 701 over a channel of the sensor have a greater effect on the capacitance at the channel. Gaps 703 between the ridges 701 have a smaller effect or no effect on capacitance at a channel. In this way, individual ridges 701 of a fingerprint can be detected at channels of the fingerprint sensor 705. In contrast, touch position sensors may be configured to detect a finger or stylus and possibly motion of the touching object at sensor channels of the touch position sensor.

Figure 8:
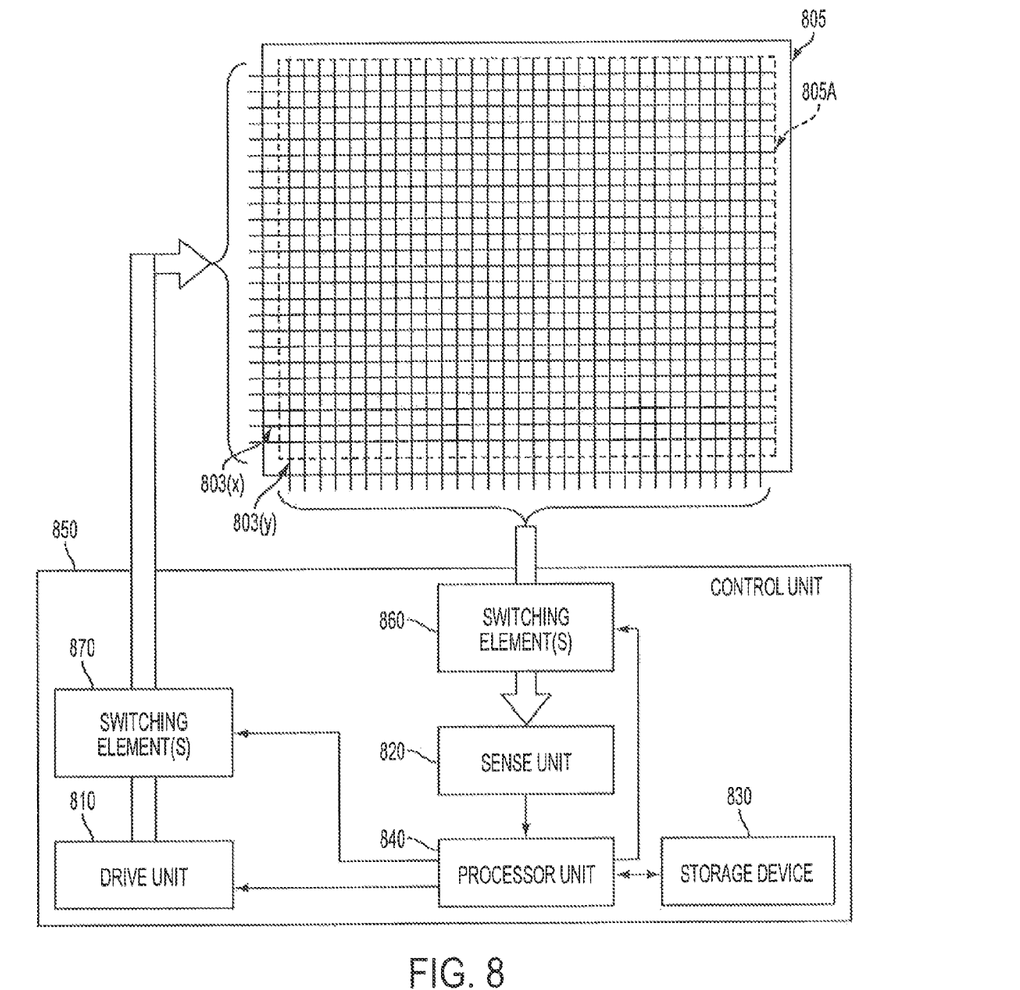
FIG. 8 schematically illustrates another example of a capacitive sensing panel and an electrode pattern as well as an example of a control unit for that exemplary panel.

In another example, represented schematically in FIG. 8, the sensing area 805A of a capacitive sensor 805 may be switchable between a fingerprint sensing mode and a touch sensing mode. In the fingerprint sensing mode, any or all of the touch sensing area 805A may function as a fingerprint sensor. In a touch position sensing mode, the signals from multiple channels may be combined to effectively provide a smaller number of channels.

The capacitive sensor panel 805 includes drive electrodes 803(*x*) and sense electrodes 803(*y*) formed in the sensing area 805A on different surfaces of one or more common substrates in a manner similar to the drive and sense electrodes of the earlier examples. In this example, all of the electrodes 803(*x*) and 803(*y*) are patterned at a scale and spacing suitable to allow fingerprint sensing. The number of channels in a unit of area of the capacitive sensor panel 805 may be high enough to provide the resolution for a fingerprint function, in a manner similar to the fingerprint sensors in the earlier examples but higher than in the touch position sensors in the earlier examples.

The capacitive sensor panel 805 may be operated to perform touch sensing and fingerprint sensing at different times. In a manner somewhat analogous to the operation of the example of FIG. 5, the data may be unlocked and/or an application may be launched following determination of a fingerprint while the sensor 805 operates in the fingerprint sensing mode. However, for some time thereafter, fingerprint sensing may be unnecessary and the sensor 805 operates in a touch position sensing mode. The sensing device or system illustrated in FIG. 8 includes a control unit 850. The control unit 850 may be in communication with the capacitive sensor 805. In the fingerprint sensing mode, the control unit 850 may process signals on all of the channels separately for full resolution. In the touch position sensing mode, the control unit 850 may combine signals of groups of channels in order to effectively provide a smaller number of channels for sensing touch position and movement. The smaller number of channels provides lower resolution but may allow for faster processing speeds.

In the example of FIG. 8, the control unit 850 includes a drive unit 810, a sense unit 820, a storage device 830 and a processor unit 840. The storage device 830 may store programming for execution by the processor unit 840 and data used in or resulting from operations of the processor unit 840. The control unit 850 may be provided as a single integrated circuit chip such as a general purpose microprocessor, a microcontroller, a programmable logic device/array, an application-specific integrated circuit (ASIC), or a combination thereof. In another example, the drive unit 810, the sense unit 820 and the processor unit 840 all may be provided in separate control units.

The processor unit 840 controls the drive unit 810 to supply drive signals to the drive electrodes 803(*x*), so as to induce charge on the sense electrodes 803(*y*) that intersect with the drive electrodes 803(x). The sense unit 820 senses charge at the various intersections via the sense electrodes 803(y), and the sense unit 820 provides measurement signals representing node capacitance to the processor unit 840. To allow operation in the two different sensing modes, in one example, the drive electrodes 803(x) connect to the drive unit 810 via one or more first switching elements 870 and the sense electrodes 803(y) connect to the sense unit 820 via one or more second switching elements 860. The switching elements 860, 870 are controlled by the processor unit 840.

In the fingerprint sensing mode, the processor unit 840 controls the switching elements 860 and 870 and the drive and sense units 810 and 820 to implement sensing at all of the intersections on the sensor panel 805 and provide full sensing resolution. Each drive electrode 803(x) may be driven, and signals from each sense electrode 803(y) may be sensed. In the touch position sensing mode, the processor unit 840 controls the switching elements 860 and 870 and the drive and sense units 810 and 820 to drive and sense via a smaller number of channels. Selected subsets of the drive and sense electrodes may be used. In this example, the drive signals are applied to groups of drive electrodes 803(x) forming a smaller number of drive channels, and signals are sensed from groups of sense electrodes 803(y) forming a smaller number of sense channels.

In the fingerprint sensing mode, the processor unit 840 may process data from the sense unit 820 and determine a shape of a fingerprint to recognize a particular finger of a user's hand and/or to detect the ridges of a fingerprint. The programming of the processor unit 840 may enable the processor to compare a sensed ridge pattern to fingerprint shape pattern data stored in the storage device 830, to detect which finger of the hand has touched the sensor panel 805 and/or to match the sensed ridge pattern to the pattern of a particular known fingerprint. For example, fingerprint pattern data stored in the storage device 830 may include one or more fingerprint patterns of one or more specific users. In addition to or instead of storing specific fingerprint patterns, pattern data stored in the storage device 830 may include general patterns for identifying a specific finger, including an index finger, a middle finger, a ring finger, a little finger and a thumb, which may be used for distinguishing generally between different fingers. In another example, the processor unit 840 may be programmed to pass sensed fingerprint pattern data to higher level logic in a device in which the panel 805 and control unit 850 are incorporated, to allow the higher level logic of the device to analyze the sensed fingerprint pattern.

In the touch sensing mode, the processor unit 840 is capable of processing data from the sense unit 820 and determining presence and location of a touch on the panel 805. Tracking of touch movement may allow detection of a touch gesture.

A process of manufacturing any of the capacitive sensors discussed above relative to FIGS. 1-8 includes patterning electrodes of the touch position sensor and the fingerprint sensor. In the case where a layer of the electrodes of either or both sensors includes ITO, the process of patterning the electrodes on the respective substrate may include depositing a positive or negative resist over unpatterned ITO on the substrate; exposing the photoresist to UV light through a mask of the appropriate pattern; developing the resist by washing away unexposed resist with a solvent; and etching away the exposed ITO areas using a suitable etchant. The exposed photoresist may be removed using a suitable solvent.

An example of a suitable etching liquid for use in removing exposed ITO is an etching acid. Examples of a suitable removal liquid for the photoresist include organic solvents. Other suitable positive and negative photoresists, etching liquids and photoresist removal liquids may be used.

As another example, ITO may be deposited on a substrate by sputtering ITO onto the substrate using a shadow mask having a pattern suitable for formation of electrodes in any of the shapes as described above.

Organic conductive materials such as PEDOT may be patterned using printing methods, such as ink-jet or screen printing.

Electrodes of both sensors formed of ITO or PEDOT and formed on the same surface of the same substrate may be formed at the same time in the same processing step(s).

Patterning fine lines of a conductive material for one or both sensors may include deposition of the metal or other conductive material by evaporation through a mask in the appropriate pattern.

In other examples, the pattern of fine-line metal for electrodes may be formed by a printing process in which a conductive material or conductive material precursor is printed, for example, by inkjet printing, to form the appropriate electrode pattern. In the case where a catalytic precursor ink is used, the process involves treating the precursor ink to convert the precursor ink to a final conductive material, for example, by electroless plating. In another example, the substrate may be uniformly coated with a catalytic photosensitive ink. The ink may be exposed to UV light through a photomask or vector-exposed to UV light from a laser or other suitable light source and rinsed with solvent to wash away the unexposed ink. The remaining ink may be immersed in a metal plating bath to form the fine conductive lines. Suitable catalytic inks are commercially available.

Where electrodes of the fingerprint and touch sensors are both formed of lines of the same opaque conductive material and formed on the same surface of the same substrate, the electrodes of both sensors may be formed at the same time in the same processing step(s).

Although some exemplary processes are given above for forming the various electrodes of the capacitive touch position sensor and the capacitive fingerprint sensor, it will be appreciated that any suitable way of forming these electrodes and conductors can be used in conjunction with the disclosure provided herein.

The capacitive sensors described above can be attached to numerous electronic Devices. Examples of the electronic devices include computers, personal digital assistants, satellite navigation devices, mobile phones, portable media players, portable game consoles, public information kiosks, point of sale systems and appliances. At least some of these types of electronic devices may include a central processor or other processing device for executing program instructions, an internal communication bus, various types of memory or storage media, for code and data storage and one or more network interface cards or ports for communication purposes.

A fingerprint sensor, included in capacitive sensor with a touch position sensor as described herein, may provide increased security of data stored in the memory of an electronic device as described above. Use of the fingerprint sensor may simplify accessibility of data or executable programs stored on such an electronic device by reducing the requirements for a user to memorize one or more usernames and/or passwords. Use of the fingerprint sensor in a small or portable device also may simplify accessibility by reducing instances of the potentially awkward and time-consuming process of user entry of one or more usernames and/or passwords on a small keypad or touch screen of a small or portable device.

Various modifications may be made to the examples described in the foregoing, and any related teachings may be applied in numerous applications, only some of which have been described herein. It is intended by the following claims to claim any and all applications, modifications and variations that fall within the true scope of the present teachings.

What is claimed is:

1. A method of forming a capacitive sensor, the method comprising:
    forming, on a surface of a substrate a first plurality of sense electrodes and drive electrodes in a touch sensing area, the first plurality of sense electrodes and drive electrodes forming a capacitive touch position sensor configured to enable detection of the presence and position of a touch in the touch sensing area; and
    forming, on the surface of the substrate, a second plurality of sense electrodes and drive electrodes in a fingerprint sensing area, the second plurality of sense electrodes and drive electrodes forming a capacitive finger print sensor configured to enable identification of the fingerprint of a finger placed in the fingerprint sensing area.

2. The method of claim 1, further comprising forming the fingerprint sensing area outside the touch sensing area.

3. The method of claim 1, further comprising forming the fingerprint sensing area within the touch sensing area.

4. The method of claim 3, further comprising coupling the second plurality of sense electrodes and drive electrodes of the capacitive fingerprint sensor to a switching element for switching the second plurality of sense electrodes and drive electrodes between a fingerprint recognition mode and a touch sensing mode.

5. The method of claim 4, wherein the capacitive fingerprint sensor comprises at least two channels, the capacitive fingerprint sensor configured to combine the at least two channels while operating in the touch sensing mode.

6. The method of claim 1, wherein a first density of the second plurality of sense electrodes and drive electrodes of the capacitive fingerprint sensor is greater than a second density of the first plurality of sense electrodes and drive electrodes of the capacitive touch position sensor.

7. The method of claim 1, further comprising forming the first plurality of sense electrodes and drive electrodes of the capacitive touch position sensor and the second plurality of sense electrodes and drive electrodes of the capacitive finger print sensor from a common conductive material.

8. The method of claim 7, wherein the common conductive material comprises an opaque conductive material.

9. The method of claim 7, wherein the common conductive material comprises a transparent conductive material.

10. The method of claim 9, wherein the transparent conductive material is selected from the group consisting of transparent indium tin oxide, antimony tin oxide, tin oxide, PEDOT, conductive polymers, carbon nanotube, and metal nanowire impregnated material.

11. The method of claim 1, wherein the first plurality of sense electrodes and drive electrodes forming the capacitive touch position sensor are formed from a mesh or other pattern of fine lines configured to allow transmission of light through the mesh electrodes.

12. The method of claim 1, wherein the first plurality of sense electrodes and drive electrodes forming the capacitive touch position sensor and the first plurality of sense electrodes and drive electrodes forming the capacitive finger print sensor are formed during a same processing step.

13. The method of claim 1, wherein the first plurality of sense electrodes and drive electrodes forming the capacitive touch position sensor and the first plurality of sense electrodes and drive electrodes forming the capacitive finger print sensor are formed from a common material.

14. The method of claim 1, wherein at least one of the capacitive touch position sensor and the capacitive finger print sensor comprise a self-capacitance sensor.

15. The method of claim 1, wherein at least one of the touch position sensor and the capacitive finger print sensor comprise a mutual capacitance sensor.

16. The method of claim 1, further comprising coupling the plurality of sense electrodes and drive electrodes of the capacitive touch position sensor and the plurality of sense and drive electrodes of the capacitive finger print sensor to a common printed circuit board.

17. The method of claim 1, further comprising:
    coupling the plurality of sense electrodes and drive electrodes of the capacitive touch position sensor to a first printed circuit board; and
    coupling the plurality of sense and drive electrodes of the capacitive finger print sensor to a second printed circuit board.

18. The method of claim 1, further comprising positioning a display under the capacitive touch position sensor for viewing through the touch sensing area.

* * * * *